3,281,430
OXATHIOLANES AND RELATED COMPOUNDS
Roger Williams Addor, Pennington, N.J., assignor to American Cyanamid Company, Stamford, Conn., a corporation of Maine
No Drawing. Filed Nov. 7, 1963, Ser. No. 322,062
6 Claims. (Cl. 260—327)

The present invention relates to phosphinyloximino heterocyclic sulfur moieties containing from five to six membered rings and has for its principal object the utilization of such phosphinyloximino compounds as the active component of an insecticidal composition.

The novel hetero-sulfur compounds prepared in accordance with the present invention, which have utility as effective insecticides, may be represented by the general formula:

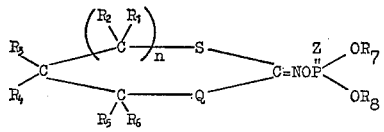

wherein $R_1$, $R_2$, $R_3$, $R_4$, $R_5$ and $R_6$ are each hydrogen, a lower alkyl or a phenyl radical, which may be the same or different; $n$ is an integer from 0 to 1; Q and Z represent either a sulfur or oxygen atom; and $R_7$ and $R_8$ are hydrogen or a lower alkyl radical.

In general, the compounds of the present invention may be prepared by the reaction between a 2-oximino derivative of the heterocyclic sulfur moiety or the corresponding alkali metal salt thereof and either a dialkylphosphorochloridate or a dialkylphosphorochloridothioate in an alkaline medium. Each reactant is advantageously present in equimolar amounts at temperatures ranging from about 0° C. to about 100° C., and preferably at temperatures below about 40° C., until the reaction has been completed. Thereafter, the mixture is generally permitted to stand for several hours prior to separation and recovery of desired product.

The over-all reaction may be represented as:

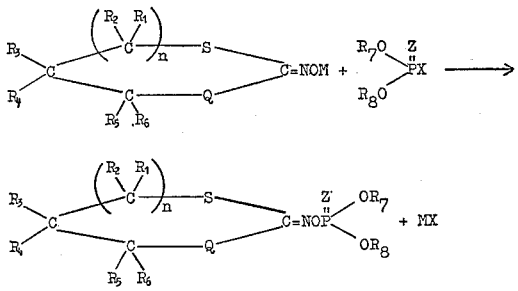

wherein $R_1$, $R_2$, $R_3$, $R_4$, $R_5$, $R_6$, $R_7$ and $R_8$, Q, Z and $n$ represent the same values as above; M is an alkali metal, such as sodium, potassium or lithium; and X is a halogen atom, such as fluoro, chloro, bromo or iodo.

Typical phosphorhalothioates or phosphorohaloate reactants employed above are:

O,O-dimethyl phosphorochloridothioate,
O,O-diethyl phosphorochloridothioate,
O-methyl, O-ethyl phosphorochloridothioate,
O,O-diisopropyl phosphorobromidothioate,
O,O-di-n-butyl phosphorochloridothioate,
O,O-di-sec-pentyl phosphoroiodothioate,
O,O-dimethyl phosphorochloridate, and
O,O-diethyl phosphorochloridate.

The heterocyclic reactants possessing the desired 2-oximino substituent can be prepared from a variety of heterocyclic compounds which include: 2-imino-1,3-dithiolane, 2-imino-1,3-oxathiolane, 2-imino-1,3-dithiane, 2-imino-1,3-oxathiane, 2-methylimino-1,3-dithiolane, 2-ethylimino-1,3-oxathiolane, 2-n-propylimino-1,3-dithiane, 2-n-butylimino-1,3-oxathiane, as well as the ring-substituted lower alkyl or ring-substituted phenyl derivatives thereof. In general, the 2-imino heterocyclic sulfur reactant can be initially prepared in a straightforward manner by bringing into reactive combination approximately equimolar amounts of a cyanogen halide and a thiol, such as ethanedithiol-1,2; 1-hydroxy-2 mercaptoethane; propane-1,2-dithiol; propane-1,3-dithiol; 1-mercapto-3-hydroxypropane; 2-methylpropane-1,3-dithiol; butane-1,2-dithiol or 2,5-dimethylhexene-3,4-dithiol, homologs and isomers thereof, preferably in the presence of an acidified alcoholic catalyst, such as hydrogen chloride-ethanol, when utilizing a dithiol as the reactant. However, a 2-alkylimino heterosulfur reactant can be prepared by reacting a lower alkyl ammonium alkyldithiocarbamate salt and an alkylene dihalide, such as ethylene bromide, ethylene chloride, 1,2-dibromopropane, 1,3-diiodopropane and 1,3-dichloropropane. Resultant 2-imino-heterocyclic sulfur hydrohalide or 2-alkylimino-heterocyclic sulfur hydrohalide can be reacted next with a hydroxylamine salt, such as either hydroxylamine hydrohalide or hydroxylamine sulfate, to obtain 2-oximino-hetero-sulfur derivatives which are utilized as reactants herein.

In order to facilitate a further understanding of the present invention, the following illustrative examples are presented. These are not to be taken as limitative of the invention. Unless otherwise stated, the parts are by weight and the analyses in percent.

EXAMPLE 1

*Preparation of 2-imino-1,3-dithiolane hydrochloride*

To a mixture of 25.0 parts of ethanedithiol in 125 parts (by volume) of dry acetonitrile at 0° C. to 5° C. in a vessel equipped with a condenser, are added 17.2 parts of cyanogen chloride over a thirty minute period. After stirring at 35° C. to 40° C. for four hours, the mixture remains at room temperature overnight. The product is collected as colorless needles weighing 27.3 parts, corresponding to a yield of 66.2 percent of theory, and melting at 218° C. to 220° C. with decomposition.

Analysis for $C_3H_6NClS_2$.—Calculated: Cl, 22.8. Found: Cl, 22.6.

In the foregoing example, similar results are obtained where cyanogen bromide is substituted for cyanogen chloride.

EXAMPLE 2

*Preparation of 2-imino-1,3-oxathiolane hydrochloride*

A mixture of 50 parts of mercaptoethanol in 200 parts of benzene in a flask equipped with a stirrer, ice-water-cooled condenser, gas inlet tube and thermometer is heated to 50° C. and 44 parts of a gaseous cyanogen chloride are passed in over a two and one-half hour period. The temperature rises spontaneously to 60° C. to 65° C. when about half of the cyanogen chloride is added, solids begin forming, and the temperature stays at this level during the remainder of the addition period. After the mixture has been maintained at 40° C. to 45° C. for an additional four and one-half hours and stayed overnight at room temperature, the solid 2-imino-1,3-oxathiolane hydrochloride amounting to 47 parts, or 52 percent of theory, is collected.

EXAMPLE 3

*Preparation of 2-imino-5-methyl-1,3-oxathiolane hydrochloride*

Example 1 is repeated in every detail, except that 1-hydroxy-2-mercapto-n-propane is substituted for the ethanedithiol reactant therein. Resultant product, 2-imino-5-methyl-1,3-oxathiolane hydrochloride, is obtained in good yield and purity.

EXAMPLE 4

Preparation of 2-isopropylimino-1,3-dithiolane

To a stirred mixture of ethylene bromide (10.0 parts) and 8.8 parts of potassium carbonate in 75 parts of absolute ethanol at 38° C. to 40° C. are added 10.4 parts of isopropylamino ammonium isopropyldithiocarbamate in small increments over a one-hour period. After heating to reflux for ten minutes, the mixture is cooled, resultant solids are filtered off, and the alcohol solution diluted with about three volumes of water. Extraction of the aqueous mixture with ether followed by stripping off the ether and distillation of the residue affords 6.5 parts or 76 percent of theory of 2-isopropylimino-1,3-dithiolane having a boiling point of 81° C. to 83° C. at 0.30 mm. Hg and a refractive index ($n_D^{25}$) equal to 1.5671.

Analysis for $C_6H_{11}NS_2$.—Calculated: C, 44.68; H, 6.88; S, 39.76. Found: C, 44.82; H, 7.09; S, 39.85.

EXAMPLE 5

Preparation of 4-methyl-2-methylimino-1,3-dithiolane

To a stirred mixture of 99.7 parts of 1,2-dibromopropane in 300 parts of ethanol at 40° C. are added 65.9 parts of methylamino ammonium methyldithiocarbamate over a period of one hour. After heating for an additional hour at 50° C., the mixture is cooled, 300 parts of ether and one equivalent of sodium hydroxide are added, and the organic phase is separated. The organic phase is dried with magnesium sulfate and the solvent stripped. Distillation of the residue yields 15.9 parts of desired product and 22.8 parts of unreacted dibromopropane. A sample of the product on redistillation boils at 54° C./0.04 mm. Hg, and has a refractive index ($n_D^{25}$) equal to 1.5781.

Analysis for $C_5H_9NS_2$.—Calculated: C, 40.78; H, 6.16; S, 43.55. Found: C, 40.94; H, 6.17; S, 43.52.

EXAMPLE 6

Preparation of 2-imino-1,3-dithiane hydrochloride

To a mixture of 130 parts of chloroform nearly saturated with dry hydrogen chloride in a flask equipped with a stirrer, ice-water-cooled condenser, gas inlet tube and thermometer are added 27.7 parts of propane-1,3-dithiol. Subsequent slow addition of 18 parts of gaseous cyanogen chloride over a two hour period causes a spontaneous temperature rise to 42° C. After completion of cyanogen chloride addition, the mixture is heated at 50° C. to 55° C. for one hour. The crystalline product amounts to 24.1 parts or 55.5 percent of theory. The sample is sublimed at 95° C. to 100° C./0.05 mm. Hg for analysis. It melts with darkening at 155° C. to 160° C.

Analysis for $C_4H_8ClNS_2$.—Calculated: C, 28.31; H, 4.75; Cl, 20.89. Found: C, 27.99; H, 5.18; Cl, 20.89.

EXAMPLE 7

Preparation of 2-oximino-1,3-dithiolane

A mixture of 0.21 part of 2-isopropylimino-1,3-dithiolane obtained in Example 4 above, and 0.10 part of hydroxylamine hydrochloride is heated on the steam bath with 3.0 parts of water and sufficient ethanol to initially dissolve the reactants. After two hours, most of the ethanol has boiled away and, on ice-cooling the remaining mixture, the product crystallizes. The water is decanted off and the solids are rinsed with water and vacuum-dried. The 2-oximino-1,3-dithiolane, melting point 124° C. to 127° C., weighs 0.14 part, or 80 percent of theory.

EXAMPLE 8

Preparation of 2-oximino-1,3-dithiolane

A mixture consisting of 55.0 parts of 2-imino-1,3-dithiolane hydrochloride obtained in Example 1 above, 27.1 parts of hydroxylamine hydrochloride and 34.8 parts of sodium acetate is heated at 70° C. to 75° C. for one hour. Crystallization of the resultant oxime occurs. After cooling to room temperature and filtering, a 87.6 percent yield of colorless 2-oximino-1,3-dithiolane is obtained, melting at 126° C. to 128° C.

EXAMPLE 9

Preparation of 2-oximino-1,3-oxathiolane

To a stirred mixture of 19.0 parts of 2-imino-1,3-oxathiolane hydrochloride and 10.4 parts of hydroxylamine hydrochloride in 75 parts of water are added 12.3 parts of solid sodium acetate in increments over a two-hour period. After twenty-four hours, 12.5 parts of solid sodium bicarbonate are added slowly. The mixture is filtered, the filtrate is diluted with an equal volume of a saturated salt solution, and the mixture is continuously ether extracted for fourteen hours. The semi-solid residue obtained by evaporation of the ether is extracted several times with hot benzene. The benzene on dilution with hexane gives several fractions of solids which are combined. Recrystallization from benzene plus a small quantity of hexane affords 5.2 parts, or 32 percent of theory, of 2-oximino-1,3-oxathiolane having a melting point of 111° C. to 116° C. Sample recrystallized further melts at 116.4° C. to 117.2° C.

Analysis for $C_3H_5NO_2S$.—Calculated: C, 30.24; H, 4.23; N, 11.76; S, 26.91. Found: C, 30.29; H, 4.24; N, 11.76; S, 26.96.

EXAMPLE 10

Preparation of 4-methyl-2-oximino-1,3-dithiolane

A solution of 10.0 parts of 4-methyl-2-methylimino-1,3-dithiolane and 5.2 parts of hydroxylamine hydrochloride in 80 parts of 40% ethanol is heated on a steam bath for four hours. The yellow oily product obtained after extracting the reaction mixture with ether, treating the ether solution with activated carbon and magnesium sulfate, and stripping off the ether, amounts to 9.1 parts or 90 percent of theory. The infrared spectrum shows the expected >C=N— band absorption at 1600 cm.$^{-1}$.

EXAMPLE 11

Preparation of 2-oximino-1,3-dithiane

A mixture of 18.0 parts of 2-imino-1,3-dithiane hydrochloride, 8.1 parts of hydroxylamine hydrochloride, and 9.6 parts of sodium acetate in 200 parts of water is slowly heated to 64° C. over a one-hour period and then to 75° C. over the next fifteen minutes. After cooling the mixture, extraction with ether in the usual manner affords 11.6 parts of product as an oil which soon crystallizes. Recrystallization from the benzene-hexane mixture gives 8.9 parts of the oxime, melting point 92.4° C. to 94.8° C. A small sample recrystallized once again for analysis melts at 94.0° C. to 95.0° C.

Analysis for $C_4H_7NOS_2$.—Calculated: C, 32.19; H, 4.73; N, 9.39; S, 42.97. Found: C, 32.11; H, 4.86; N, 9.30; S, 42.98.

EXAMPLE 12

Preparation of 2-oximino-5-methyl-1,3-oxathiolane

To an agitated mixture of 100.0 parts of 2-imino-5-methyl-1,3-oxathiolane hydrochloride and 45.3 parts of hydroxylamine hydrochloride in 200 parts of dry methanol are added in increments at room temperature over a one hour period 53.4 parts of sodium acetate. After stirring the mixture at room temperature overnight, it is heated at 50° C. for two hours and then cooled. There are then added 66 parts of potassium bicarbonate and 200 parts of ether followed by stirring for two hours, and the reaction mixture is then filtered. The filtrate is next concentrated. Extraction of the residue successively with benzene and ether, followed by concentration of the ether-benzene mixture, yields 56.9 parts of crude product. The oil remaining from the benzene-ether extraction is mixed with methanol and 200 parts of chloroform and the mixture is washed successively with partially saturated salt solution and with a saturated salt solution. After filtering through magnesium sulfate, concentration of the chloroform mixture leaves another 23.0 parts of crude oxime. Recrystallization of the combined crude oxime from a 1:1 benzene-ether mixture gives 40.0 parts, or 46.2 percent of theory of product, having a melting point equal to 92° C. to 94° C. A sample, vacuum sublimed for analysis, melts at 94.0° C. to 95.2° C.

Analysis for $C_4H_7NO_2S$.—Calculated: C, 36.07; H, 5.30; N, 10.52; S, 24.08. Found: C, 36.27; H, 5.45; N, 10.56; S, 24.21.

EXAMPLE 13

*Preparation of 4,5-dimethyl-2-oximino-1,3-dithiolane*

A mixture of 15.0 parts of 4,5-dimethyl-2-imino-1,3-dithiolane hydrochloride, 6.3 parts of hydroxylamine hydrochloride, and 7.8 parts of sodium acetate in 115 parts of water is stirred and heated at 75° C. to 80° C. for one hour. The solids which form on ice-cooling the mixture, are collected, washed with water and allowed to dry. Recrystallization from benzene-hexane affords 10.1 parts or 75.6 percent of theory, of colorless product melting at 100° C. to 103° C.

Analysis for $C_5H_9NOS_2$.—Calculated: C, 36.78; H, 4.38; N, 8.58; S, 39.27. Found: C, 37.33; H, 4.43; N, 8.57; S, 39.37.

EXAMPLE 14

*Preparation of 4-n-butyl-2-oximino-1,3-dithiolane*

A mixture of 13.0 parts of 4-n-butyl-2-imino-1,3-dithiolane hydrochloride, 4.7 parts of hydroxylamine hydrochloride, and 5.8 parts of sodium acetate is stirred and heated at 70° C. to 80° C. for two hours. On cooling, a viscous oil separates. The water is decanted away from the oil and the oil taken up with ether and dried by filtration through magnesium sulfate. Evaporation of the ether gives 10.7 parts, or 91.8 percent of theory, of the oxime. The infrared absorption curve of the oxime shows bands at 950 cm.$^{-1}$ and 1580 cm.$^{-1}$ attributable to the =N—O— and =C=N— bands, respectively, and several bands in the 2800 cm.$^{-1}$ and 3300 cm.$^{-1}$ region assignable to the —OH function.

EXAMPLE 15

*Preparation of 4-phenyl-2-oximino-1,3-dithiolane*

The procedure of Example 14 is repeated in every detail, except that 2.8 parts of 4-phenyl-2-imino-1,3-dithiolane hydrochloride are employed in lieu of the 4-n-butyl dithiolane reactant to provide 2.3 parts, or 91.7 percent of theory, of 4-phenyl-2-oximino-1,3-dithiolane as a viscous oil. The infrared absorption curve of this product, in addition to showing numerous bands assignable to the phenyl ring, shows a =C=N band at 1575 cm.$^{-1}$ and three bands assignable to the N—O—H function at 2800 cm.$^{-1}$, 2920 cm.$^{-1}$ and 3200 (broad) cm.$^{-1}$.

EXAMPLE 16

*Preparation of 2-diethoxyphosphinyloxyimino-1,3-dithiolane*

To an ice-cooled mixture of 9.1 parts of the sodium salt of 2-oximino-1,3-dithiolane dispersed in 50 parts by volume of dry acetone are added 10.0 parts of O,O-diethyl-phosphorochloridate in a suitable reaction vessel. The reaction is essentially complete after two hours at 0° C. as indicated by infrared spectrum analysis of the reaction mixture.

After fourteen hours at 0° C. and one hour at 38° C. to 39° C., the solids present are filtered off and the mother liquor is concentrated to yield 15.8 parts of pale yellow oil. Thin layer chromatography on silica gel indicates the presence of two closely associated components. The minor component, later identified as 2-oximino-1,3-dithiolane, is removed from the less volatile product by molecular distillation at 85° C. to 90° C. and 2 mm. Hg. The undistilled material is mixed with 200 parts of ether and the mixture is filtered and concentrated in vacuo to yield 12.0 parts, or 76.5 percent, of 2-diethoxyphosphinyloxyimino-1,3-dithiolane, having a refractive index ($n_D^{25}$) equal to 1.5306, as a pale yellow oil pure by thin layer chromatography.

Substituting for the sodium salt of 2-oximino-1,3-dithiolane reactant, the sodium salt of 2-oximino-1,3-dithiane, the corresponding 2-diethoxyphosphinothioyloxy-imino-1,3-dithiane is obtained as a viscous liquid in good yield and purity.

EXAMPLE 17

*Preparation of 2-dimethoxyphosphinyloxyimino-1,3-diothiolane*

Into a suitable reaction vessel is stirred a mixture of 15.7 parts of the sodium salt of 2-oximino-1,3-dithiolane in 100 parts by volume of acetone. There are then added 16.0 parts of O,O-dimethylphosphorochloridate in two portions. A water bath surrounding the reaction flask prevents the exothermic reaction from exceeding 40° C. After the reaction mixture stands overnight at room temperature, it is filtered and the filtrate is concentrated in vacuo. The residue is mixed with 300 parts of chloroform and washed successively with dilute sodium hydroxide solution, water and saturated salt solution and dried over magnesium sulfate. Concentration of the filtered mixture in vacuo yields 16.6 parts, or 68.3 percent, of 2-dimethoxyphosphinyloxyimino-1,3-dithiolane as an oil, having a refractive index ($n_D^{25}$) equal to 1.5365, homogeneous according to thin-layer chromatography on silica gel.

EXAMPLE 18

*Preparation of 2-diethoxyphosphinothioyloxyimino-1,3-diothiolane*

To a 45° C. mixture of 17.3 parts of 91% 2-oximino-1,3-dithiolane as the sodium salt thereof in 100 parts by volume of dried acetone is added a solution of 18.9 parts of diethylphosphorochloridothioate in 50 parts by volume of acetone. A slow exotherm raises the temperature to about 55° C. for ten minutes. The mixture is next heated for forty-five minutes, cooled and filtered, yielding 7.0 parts of solids. The solvent is removed from the filtrate under reduced pressure, the residual oil taken up in 75 parts by volume of ether, washed with three 10-part portions of water, the ethereal solution dried over magnesium sulfate and the solvent removed under reduced pressure to yield 27.9 parts or 97 percent of a light yellow mobile oil. The product possesses a refractive index ($n_D^{25}$) equal to 1.5680 to 1.5682.

EXAMPLE 19

*Preparation of 2-diethoxyphosphinyloxyimino-5-methyl-1,3-oxathiolane*

To an ice-cooled mixture of 5.9 parts of potassium hydroxide in 50 parts by volume of methanol are added 8.0 parts of 2-oximino-5-methyl-1,3-oxathiolane. When solution is complete, the methanol is removed in vacuo, and the remaining solids are dispersed with good stirring in 50 parts by volume of acetone. To the ice-cooled mixture are added 10.4 parts of diethylphosphorochloridate and, after one hour, the reaction mixture is raised to room temperature. Stirring is continued overnight. The reaction mixture is filtered and the filtrate is concentrated in vacuo. The concentrate is remixed with a benzene-chloroform mixture. It is next washed successively with water, saturated sodium bicarbonate solution and saturated salt solution. Thereafter, it is treated with activated carbon and filtered through sodium sulfate. Concentration of the mixture in vacuo leaves 16.3 parts of pale brown oil which is reduced to 12.5 parts under high vacuum on a rotary film evaporator. The infrared absorption spectrum of the oil is consistent with that expected of the product showing bands at 1720 cm.$^{-1}$ and 1280 cm.$^{-1}$ assignable to the C=N and P=O groups, respectively. Index of refraction ($n_D^{25}$) for this product is equal to 1.4844.

To illustrate the pesticidal activity of the compounds of the present invention, the following examples are presented.

EXAMPLE 20

In the following tests, 0.1% and 0.01% solutions of 2 - diethoxyphosphinothioyloxyimino - 1,3 - dithiolane in a 50/50 acetone-water mixture are prepared. Leaves from sieva lima bean plants are dipped in the solutions and permitted to dry. When dry, they are next placed in petri dishes having a moist filter paper in the bottom of each. Ten third-instar armyworm larvae are then introduced onto each of the dishes containing the treated leaves. The dishes are covered and stored in constant temperature humidity cabinets at 80° F. and 60% relative humidity for two days. After two days, each of the various dishes containing the leaves and larvae is examined and mortality counts are made.

On examination it is noted that 100% kill of the armyworm larvae is effected with 0.1% concentration of the above-named product and 90% kill with 0.01% concentration of such material.

EXAMPLE 21

To determine the effectiveness of the compounds of the subject invention against nasturtium aphids, 0.1% and 0.01% concentrations of the compounds of Examples 16, 17, 18 and 19 are prepared in 65/35 acetone-water mixture. Potted nasturtium plants approximately two inches tall infested two days prior to testing are selected. These potted plants are then placed on a turntable and sprayed to run-off with the test solution. Following spraying, the plants are laid on their side in white enamel trays, the edges of which are coated with oil as a barrier. The trays containing the treated plants are stored under controlled temperature and humidity conditions at 70° F. and 50% relative humidity for two days and then each plant is examined and mortality counts are made.

Examination of test plants shows that 100% kill is effected with each of the above-named compounds at concentrations of 0.1% active ingredient. At a concentration of 0.01% of the compounds of Examples 17, 18 and 19, 100% kill is effected, and with the compound of Example 16, 90% kill is obtained at 0.01% concentration.

EXAMPLLE 22

The effectiveness of the compounds of the present invention is demonstrated by the following tests in which 0.1% and 0.01% concentrations of the compounds of Examples 16, 17, 18 and 19 are prepared in 65/35 acetone-water solutions. In this test, sieva lima bean plants with a minimum of two leaves each and approximately four inches in height are infested about five hours prior to testing with about 100 to 200 adult mites per leaf. Following infestation, the leaves are dipped in the test solutions for a few seconds. Thereafter, the treated plants are stored under constant temperature and humidity conditions for two days and then each plant is examined and the adult mite mortality rate determined by visual examination.

Examination of each of the treated plants at each of the above-mentioned concentrations indicates that 100% kill is effected with each of the compounds of Examples 16, 17, 18 and 19 above at concentrations of 0.1% and 0.01% of material in solution.

Advantageously, the compounds of the present invention are useful as general insecticides, and are particularly effective for controlling aphids and mites. Application of the instant compounds may be accomplished by conventional methods as by spraying, dusting, or in wettable powder formulations.

Liquid formulations may be readily prepared by dissolving a quantity of the active material in water or initially in an organic solvent and adding a sufficient quantity of water to the solution to produce the desired concentration of material in solution. A small amount of any commercially available emulsifying agent or surface active agent may be added, if desired. Generally, about 0.2% of such agent is efficient.

Wettable powders may be prepared by admixing the active ingredient with a finely divided solid carrier and a small amount of a wetting or surface active agent and dispersing the mixture in an amount of water sufficient to produce the preferred concentration.

Dust formulations are simply prepared by adding a predetermined quantity of active ingredient to a finely divided inert carrier such as talc, pumice, diatomaceous earth, attaclay, or the like.

I claim:

1. Phosphinyloximino compounds of the formula:

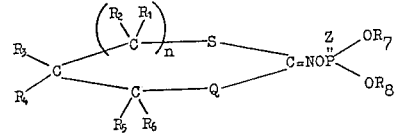

wherein $R_1$, $R_2$, $R_3$, $R_4$, $R_5$ and $R_6$ are each selected from the group consisting of hydrogen, lower alkyl and phenyl, Q and Z represent an atom selected from the group consisting of oxygen and sulfur, $n$ is an integer from 0 to 1, and $R_7$ and $R_8$ are each a radical selected from the group consisting of hydrogen and lower alkyl.

2. The compound: 2-diethoxyphosphinyloxyimino-1,3-dithiolane.

3. The compound: 2-diethoxyphosphinyloxyimino-1,3-dithiane.

4. The compound: 2 - dimethoxyphosphinyloxyimino-1,3-dithiolane.

5. The compound: 2-diethoxyphosphinothioyloxyimino-1,3-dithiolane.

6. The compound: 2-diethoxyphosphinyloxyimino-5-methyl-1,3-oxathiolane.

No references cited.

WALTER A. MODANCE, *Primary Examiner.*

JAMES A. PATTEN, *Assistant Examiner.*